United States Patent
Lai (10) Patent No.: US 9,197,524 B2
(45) Date of Patent: Nov. 24, 2015

(54) NETWORK DEVICE AND NETWORK DEVICE RECOGNITION METHOD

(71) Applicant: Accton Technology Corporation, Hsinchu (TW)

(72) Inventor: Wen-Ting Lai, Shetou Township (TW)

(73) Assignee: Accton Technology Corporation, Hsinchu (TW)

( * ) Notice: Subject to any disclaimer, the term of this patent is extended or adjusted under 35 U.S.C. 154(b) by 196 days.

(21) Appl. No.: 14/050,603

(22) Filed: Oct. 10, 2013

(65) Prior Publication Data

US 2014/0164604 A1 Jun. 12, 2014

(30) Foreign Application Priority Data

Dec. 10, 2012 (TW) ............................. 101146348 A (51) Int. Cl.
*H04L 12/24* (2006.01)
*H04L 12/26* (2006.01)

(52) U.S. Cl.
CPC ............ *H04L 43/0811* (2013.01); *H04L 43/10* (2013.01)

(58) Field of Classification Search
CPC ....................................................... H04L 12/24
USPC .......................................................... 370/241
See application file for complete search history.

(56) References Cited

U.S. PATENT DOCUMENTS

| 8,018,863 | B2 * | 9/2011 | Kini et al. | 370/248 |
| 2011/0022698 | A1 * | 1/2011 | Salam et al. | 709/224 |
| 2013/0114394 | A1 * | 5/2013 | Hu et al. | 370/216 |

FOREIGN PATENT DOCUMENTS

| CN | 102160337 A | 8/2011 |
| CN | 102215130 A | 10/2011 |

* cited by examiner

*Primary Examiner* — Robert Wilson
*Assistant Examiner* — Mewale Ambaye
(74) *Attorney, Agent, or Firm* — Birch, Stewart, Kolasch & Birch, LLP (57) ABSTRACT

A network device and network device recognition method are provided. The method includes: receiving a Continuity Check Message (CCM) by a local Maintenance Association End Point (MEP); determining whether the CCM is transmitted from an unknown remote MEP; setting the unknown remote MEP to a dynamic MEP if the CCM is transmitted from the unknown remote MEP; and recording the dynamic MEP and the receiving count of the CCM corresponding to the dynamic MEP in a storage unit.

12 Claims, 7 Drawing Sheets

NETWORK DEVICE AND NETWORK DEVICE RECOGNITION METHOD

CROSS REFERENCE TO RELATED APPLICATIONS

This Application claims priority of Taiwan Patent Application No. 101146348, filed on Dec. 10, 2012, the entirety of which is incorporated by reference herein.

BACKGROUND OF THE INVENTION

1. Field of the Invention

The disclosure is related to network device recognition technology, and, more particularly, to a method for automatically recognizing an unknown remote Maintenance Association End Point (MEP).

2. Description of the Related Art

Since more and more different telecommunication services have been applied in networks, apparatus manufacturers are required to provide network switches and other network apparatuses which providing solutions for breakdowns detection and management in the telecommunication network to guarantee all the network apparatuses have real-time detection and management capabilities for solving anomaly errors and other assorted problems. For example, Connectivity Fault Management (CFM) specified in the IEEE 802.1ag protocol and the Y.1731 protocol of ITU-T is the basic protocol for service management and maintenance, wherein the Maintenance Domain (MD) is specified for covered networks in the management of connection errors, and the boundary of the covered networks is determined by the Maintenance Association End Point (MEP) configured in the port.

In current CFM mechanisms, connection state of the current network is detected and determined through Continuity Check Messages (CCM), which are transmitted and received by all ports of the MEPs in every network apparatus. As result, users need to set the database related to the CCM of the MEP in the local network apparatus manually, otherwise the CCM from an unknown remote MEP may be abandoned and errors in determining connection state of the network would be easily occur, inconvenient operation and management of the device may be a confusion for users.

BRIEF SUMMARY OF THE INVENTION

Communication transmission systems and methods are provided to overcome the aforementioned problems.

An embodiment of the invention provides a network device recognition method, comprising following steps: receiving a Continuity Check Message (CCM) by a local Maintenance Association End Point (MEP); determining whether the CCM is transmitted from an unknown remote MEP; setting the unknown remote MEP as a dynamic MEP if the CCM is transmitted from the unknown remote MEP; and recording the dynamic MEP and a receiving count of the CCM corresponding to the dynamic MEP in a storage unit.

An embodiment of the invention provides a network device, comprising: a local MEP, receiving a CCM transmitted from a remote MEP, determining whether the remote MEP is an unknown remote MEP, setting the unknown remote MEP to a dynamic MEP if the remote MEP is the unknown remote MEP; and a storage unit, coupling with the local MEP and recording the dynamic MEP and a receiving count of the CCM corresponding to the dynamic MEP.

The network device recognition method described in connection with the aspects disclosed herein can not only record the CCM of the unknown MEP automatically, but also solve the user's problems with the maintenance and management of the current CFM technology.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
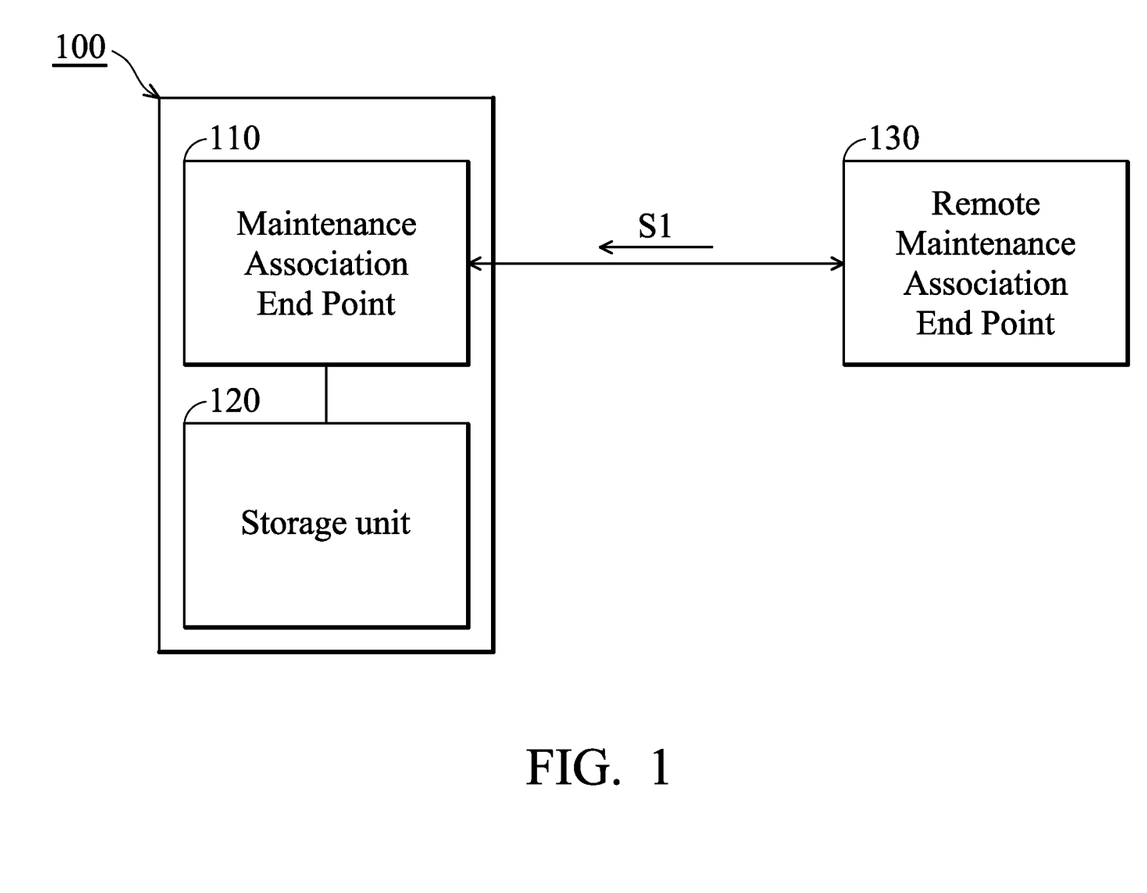
FIG. 1 is a schematic diagram illustrating a network device 100 according to an embodiment of the invention.

FIG. 1 is a schematic diagram illustrating a network device 100 according to an embodiment of current disclosure. In this embodiment, the network device 100 comprises a local Maintenance Association End Point (MEP) 110 and a storage unit 120.

In the embodiment, the local MEP 110 receives a Continuity Check Message (CCM) S1 transmitted from a remote MEP 130 and determines whether the remote MEP 130 is an unknown remote MEP. If the remote MEP 130 is an unknown remote MEP, the local MEP 110 may set the unknown remote MEP as a dynamic MEP. It is noted that the remote MEP 130 is relative to the local MEP 110, and it could be represented by the MEP of another network device or the MEP in other network and is not limited thereto. The unknown remote MEP is an unrecognized MEP which is not recorded in the database of the local MEP 110 or the storage unit 120. The local MEP 110 reads the CCM S1 for identifying the source of the CCM S1 and determines whether the source of the CCM S1 is an unknown MEP by comparing it with known or recorded remote MEPs. If the source of the CCM S1 is an unknown MEP, the local MEP 110 may set the unknown remote MEP as a dynamic MEP. For the local MEP 110, the unknown MEP has been recorded and set as a known remote MEP, and the recording type of "dynamic" is labeled or configured in the opinion columns of the record for discriminating it from the MEP had been originally recorded in the database of the local MEP 110 or the storage unit 120, or the MEP recorded by user manually. Content of such record type follows rules of CFM, is not limited thereto. In the embodiment, the storage unit 120 is coupled with the local MEP 110 for storing the record set of the dynamic MEP and the receiving count of the CCM S1 corresponding to the dynamic MEP. In an embodiment of the disclosure, the storage unit 120 can be combined with the local MEP 110 to a local MEP module (not presented in figure). In the embodiment, the local MEP 110 may be a port or a port combined with another control module, such as a micro controller or network function chip, and the storage unit 120 may be an Electrically Erasable Programmable Read-Only Memory (EEPROM) or flash memory, but the invention is not limited thereto.

In the embodiment of the invention, the local MEP 110 may activate a first timing mechanism with a first time interval after setting and storing the dynamic MEP. The first timing mechanism is configured to determine whether the CCM S1 of the dynamic MEP is received continuously during the first time interval. If the CCM S1 of the dynamic MEP is not received during the first time interval, the local MEP 110 may delete the record set of the dynamic MEP stored in the storage unit 120 and delete the record set of the receiving count of the CCM S1 corresponding to the dynamic MEP, that is to say, even though the deleted dynamic MEP is re-received by the local MEP 110, the dynamic MEP may still be recognized as an unknown remote MEP, and the local MEP 110 may reset the unknown MEP as the dynamic MEP in the storage unit 120 and store the receiving count of the CCM S1 corresponding to the dynamic MEP. If the CCM S1 of the dynamic MEP is received during the first time interval, the receiving count of the CCM S1 stored in the storage unit 120 may be updated by the local MEP 110. For example, the receiving count of the CCM S1 may be increased by 1. In an embodiment of the invention, the first time interval is set to equal to the first multiple of the CCM interval by the local MEP 110. In this embodiment, the timing mechanism is executed by the interrupt technology in the network apparatus or another clocking device (such as an oscillator) of the network apparatus, but the invention is not limited thereto.

In an embodiment of the invention, if the CCM S1 is transmitted from a known remote MEP, the local MEP 110 further determines whether the known remote MEP is a dynamic MEP. If the known MEP is the dynamic MEP, the local MEP 110 further determines whether the receiving count of the CCM S1 is greater than or equal to a default value. If the receiving count of the CCM S1 is greater than or equal to the default value, the local MEP 110 may set the dynamic MEP in the storage unit 120 as a normal MEP for reading and processing. If the receiving count of the CCM S1 is less than the preset value, the local MEP 110 may execute the first timing mechanism. It is noted that, when the receiving count of the CCM S1 from the dynamic MEP is less than the default value, user still can't read the dynamic MEP, even though the dynamic MEP has been stored in the storage unit 120. The unknown MEP still needs to be recognized for maintaining communication stability. Therefore, only when the CCM S1 of the unknown MEP is received stably and continuously during a set time interval, the communication stability of the unknown MEP may be identified and the unknown MEP may be read by the user, recorded in a normal format by labeling and setting the recorded option or field of the unknown MEP, and allowed for the relating authentication. As result, the unknown MEP is still regarded as the dynamic MEP.

In the above embodiment, if the dynamic MEP is set as the normal MEP, the local MEP 110 may activate a second timing mechanism with a second time interval and determine whether the CCM S1 of the normal MEP is received during the second time interval. If the CCM S1 of the normal MEP is not received during the second time interval, the local MEP 110 may broadcast an error notification (not shown in figures) for notifying the user that the communication state has changed, and delete the record of the normal MEP and the receiving count of the CCM S1 corresponding to the normal MEP, which is stored in the storage unit 120. In an embodiment of the invention, the second time interval is set be equal to a second multiple of the CCM interval by the local MEP 110. Since the communication stability of the unknown MEP is indefinite, the normal MEP still needs to be maintained continuously. Therefore, the normal MEP is managed by the second timing mechanism. If the communication is interrupted, the normal MEP may be deleted to maintain the communication stability of the network device 100.

In an embodiment of the invention, if the known remote MEP is not a dynamic MEP, a second timing mechanism with a second time interval may be started. In the embodiment, the second timing mechanism is similar to the above embodiment, but if the CCM S1 of the normal MEP is not received during the second time interval, the local MEP 110 may only broadcast an error notification (not shown in figures) and update the record of the known remote MEP stored in the storage unit 120. In the embodiment, because the known remote MEP is not a dynamic MEP, the known remote MEP is not set and recorded from an unknown MEP, and the known remote MEP is originally preset and pre-recorded manually in the database or the storage unit 120 by the user. Therefore, in the embodiment, the local MEP 110 may maintain the known remote MEP through different methods according to the different properties of the known remote MEP. In the embodiment, because the communication stability and reliability of the known remote MEP is better, the record of the known remote MEP stored in the storage unit 120 is not deleted and only updated.

Note that, in the first timing mechanism and the second timing mechanism of the above embodiment, the initial point of the first time interval and the second time interval are started dynamically according to the received time point of every CCM S1, or are limited statically when the first CCM S1 is received, but the invention is not limited thereto.

Figure 2A:
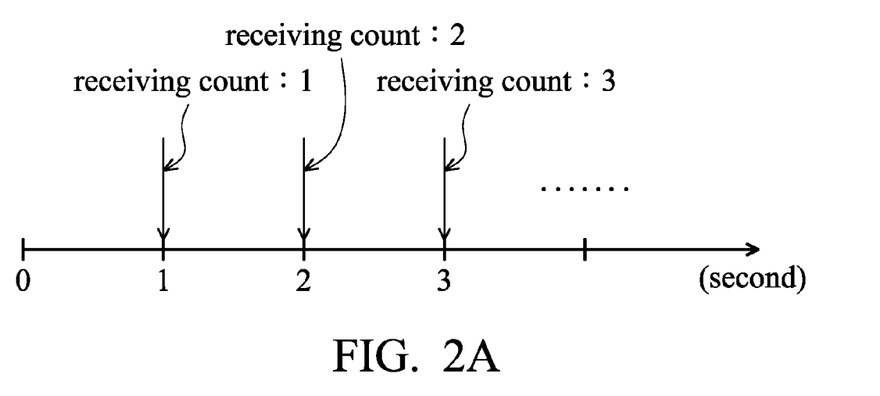
FIG. 2A is a timing diagram illustrating how the network device recognizes the remote MEP according to an embodiment of the invention.

FIG. 2A is a timing diagram illustrating how the network device recognizes the remote MEP according to an embodiment of the invention. In the embodiment, when the CCM interval is 1 second, the first time interval is set to one-and-one-half times as long as the CCM interval (i.e. 1.5 seconds), the second time interval is set to three-and-one-half times as long as the CCM interval (i.e. 3.5 seconds) and the default value is set to 3. When the receiving count of the CCM from the dynamic MEP is less than the default value, the local MEP 110 may execute the first timing mechanism for determining the receiving count of the CCM continuously, but the user still can't read the dynamic MEP at this time. When the receiving count of the CCM from the dynamic MEP is greater than or equal to the default value, the local MEP 110 may set the dynamic MEP as a normal MEP for providing to users, therefore users can know the remote MEP is currently connected to the network device. In addition, the MEP 110 may execute the second timing mechanism for determining whether the CCM of the normal MEP is received during the second time interval.

Note that the invention is not limited to the set of embodiments above, and after reading the embodiments of the invention, those who are skilled in this technology can set the appropriate values of the CCM interval, first time interval, and second time interval according to different situations, such as the different CCM intervals which are specified by the IEEE.

Figure 2B:
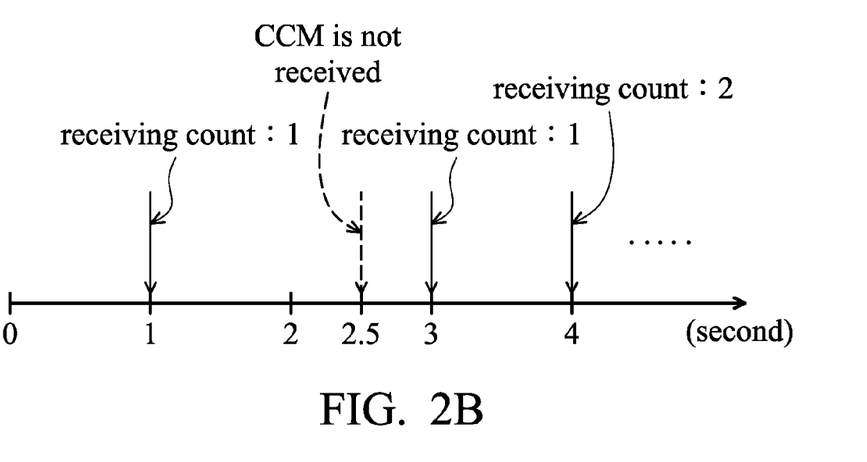
FIG. 2B is a timing diagram illustrating how the network device recognizes the remote MEP according to another embodiment of the invention.

FIG. 2B is a timing diagram illustrating how the network device recognizes the remote MEP according to another embodiment of the invention. If a subsequent CCM of the dynamic MEP is not received during the first time interval (from the 1st sec to the 2.5th sec), the local MEP will delete the dynamic MEP and the receiving count of the CCM corresponding to the dynamic MEP, which are stored in the storage unit 120. If the dynamic MEP is received again in the 3rd second, the local MEP 110 may still recognize the dynamic MEP as an unknown remote MEP, reset the dynamic MEP and the receiving count of the CCM corresponding to the dynamic MEP, and re-start the first timing mechanism.

Figure 2C:
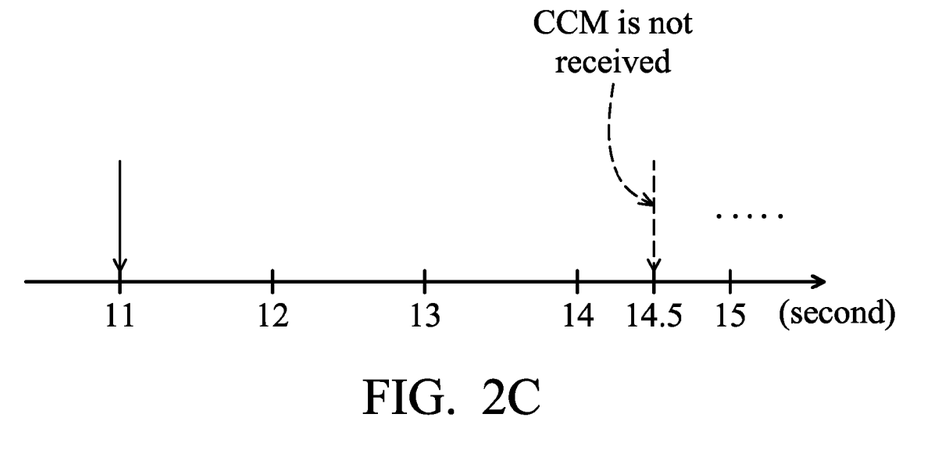
FIG. 2C is a timing diagram illustrating how the network device recognizes the remote MEP according to another embodiment of the invention.

FIG. 2C is a timing diagram illustrating how the network device recognizes the remote MEP according to another embodiment of the invention. In FIG. 2C, if the CCM of the normal MEP is not received during the second time interval (from the 11th sec to the 14.5th sec), the local MEP 110 will transmit an error notification, and delete the normal MEP and the receiving count of the CCM corresponding to the normal MEP.

Figure 3:
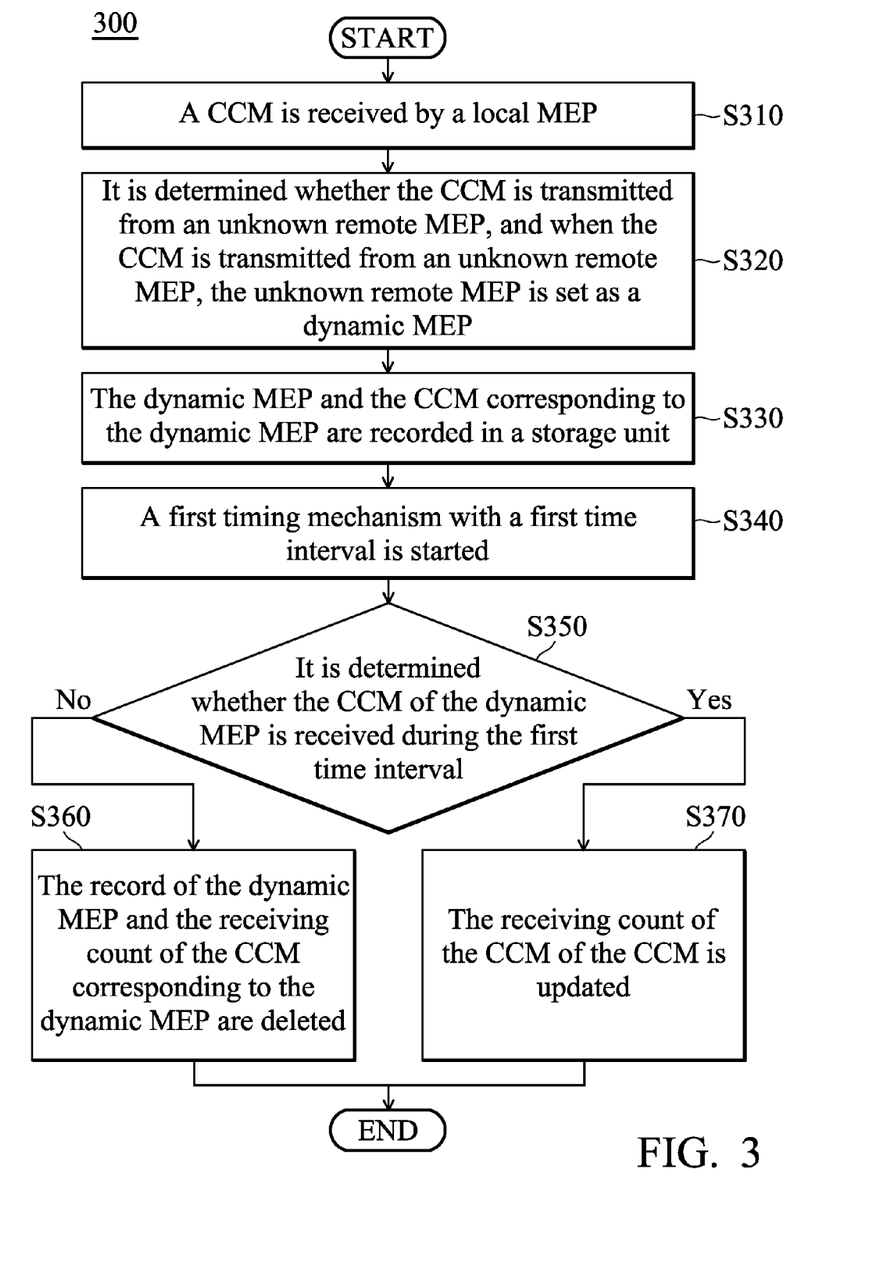
FIG. 3 is a flowchart of a network device recognition method according to an embodiment of the invention.

FIG. 3 is a flowchart of a network device recognition method according to an embodiment of the invention. According to the embodiment, the network device recognition method is configured to be applied in a network device. Firstly, in step S310, a CCM is received by a local MEP. In step S320, it is determined whether the CCM is transmitted from an unknown remote MEP, and when the CCM is transmitted from an unknown remote MEP, the unknown remote MEP is set as a dynamic MEP. In step S330, the dynamic MEP and the CCM corresponding to the dynamic MEP are recorded in a storage unit. In step S340, a first timing mechanism with a first time interval is started. In step S350, it is determined whether the CCM of the dynamic MEP is received during the first time interval. If the CCM of the dynamic MEP is not received during the first time interval, step S360 is executed. In step S360, the record of the dynamic MEP and the receiving count of the CCM corresponding to the dynamic MEP are deleted. If the CCM of the dynamic MEP is received during the first time interval, step S370 is executed. In step S370, the receiving count of the CCM of the CCM is updated. In the embodiment, the first time interval is set equal to the first multiple of the CCM interval by the local MEP.

Figure 4:
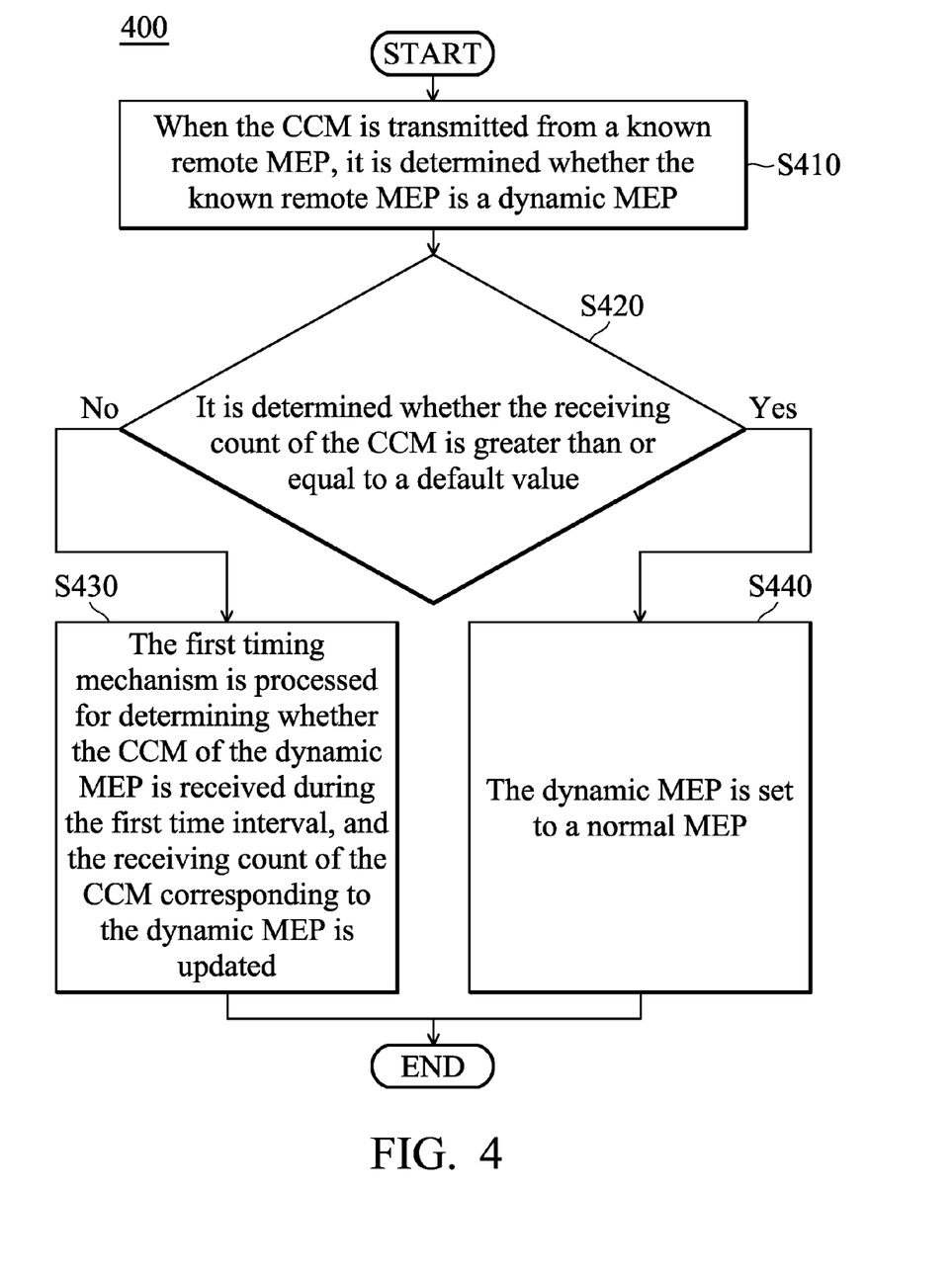
FIG. 4 is a flowchart of a network device recognition method according to another embodiment of the invention.

FIG. 4 is a flowchart of a network device recognition method according to another embodiment of the invention. Firstly, in step S410, when the CCM is transmitted from a known remote MEP, it is determined whether the known remote MEP is a dynamic MEP. When the known remote MEP is a dynamic MEP, step S420 is executed. In step S420, it is determined whether the receiving count of the CCM is greater than or equal to a default value. If the receiving count of the CCM is less than the default value, step S430 is executed. In step S430, the first timing mechanism is processed for determining whether the CCM of the dynamic MEP is received during the first time interval, and the receiving count of the CCM corresponding to the dynamic MEP is updated. If the receiving count of the CCM is greater than or equal to the default value, step S440 is executed. In step S440, the dynamic MEP is set to a normal MEP. In the embodiment, the first time interval is set equal to the first multiple of the CCM interval by the local MEP for the user to read.

Figure 5:
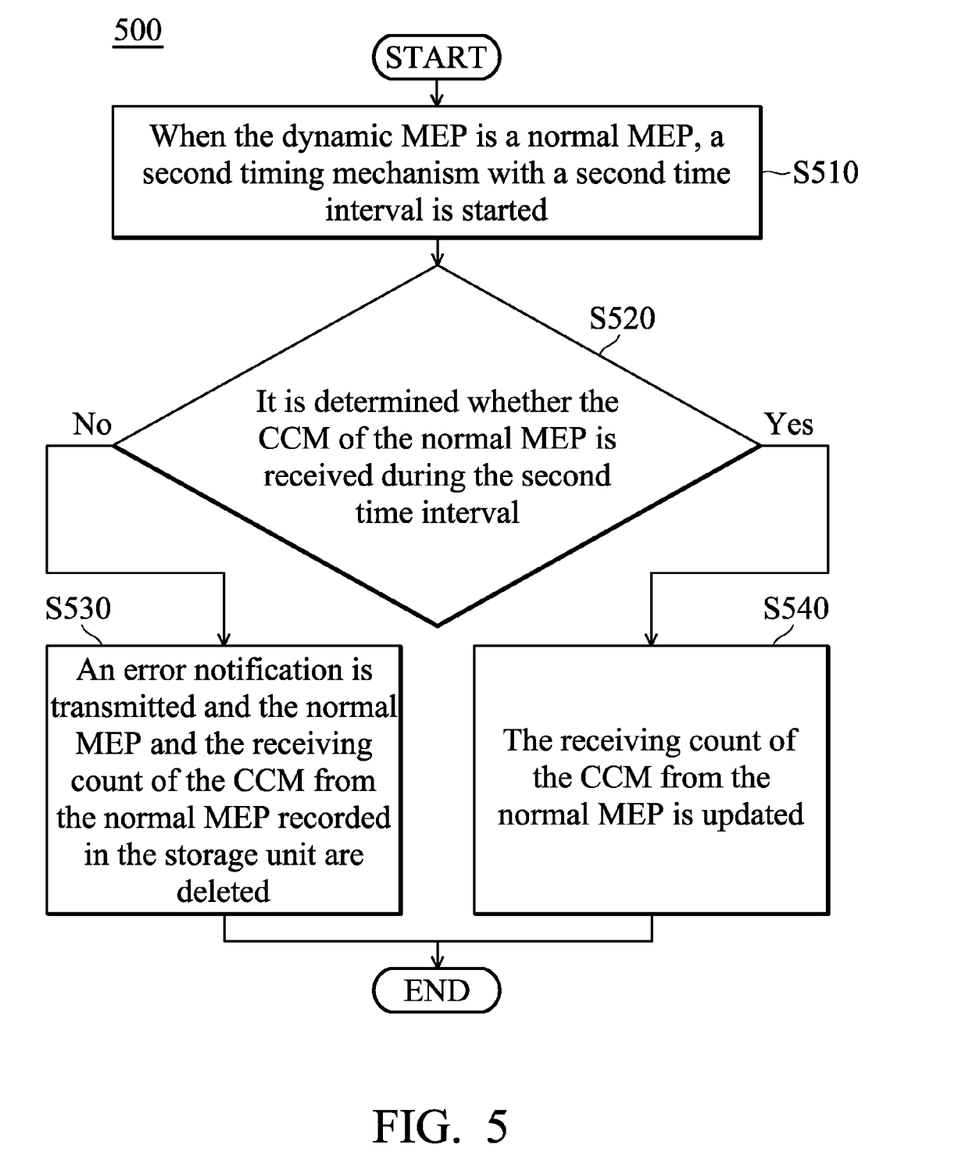
FIG. 5 is a flowchart of a network device recognition method according to another embodiment of the invention.

FIG. 5 is a flowchart of a network device recognition method according to another embodiment of the invention. Firstly, in step S510, when the dynamic MEP is a normal MEP, a second timing mechanism with a second time interval is started. In step S520, it is determined whether the CCM of the normal MEP is received during the second time interval. If the CCM of the normal MEP is not received during the second time interval, step S530 is executed. In step S530, an error notification is transmitted and the normal MEP and the receiving count of the CCM from the normal MEP recorded in the storage unit are deleted. If the CCM of the normal MEP is received during the second time interval, step S540 is executed. In step S540, the receiving count of the CCM from the normal MEP is updated. In the embodiment, the second time interval is set equal to the second multiple of the CCM interval by the local MEP.

Figure 6:
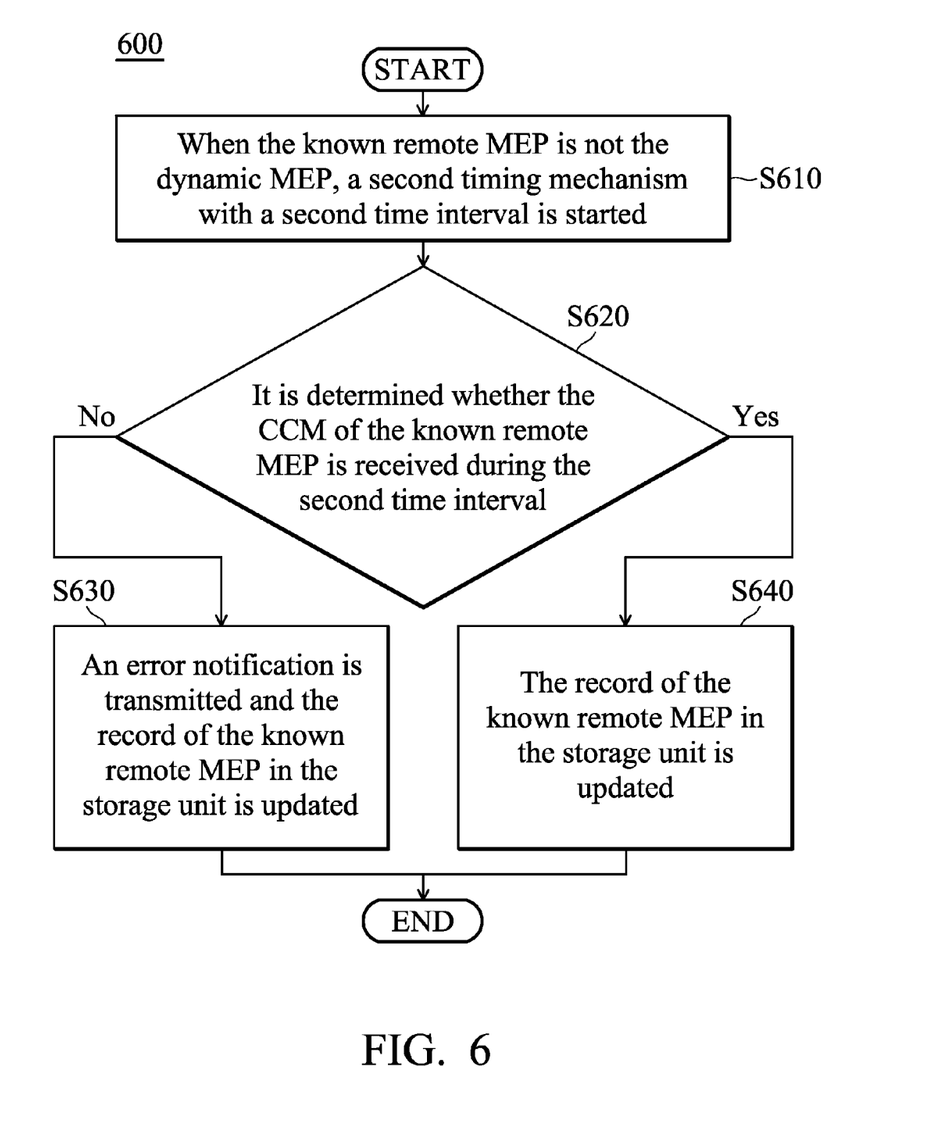
FIG. 6 is a flowchart of a network device recognition method according to another embodiment of the invention.

FIG. 6 is a flowchart of a network device recognition method according to another embodiment of the invention. Firstly, in step S610, when the known remote MEP is not the dynamic MEP, a second timing mechanism with a second time interval is started. In step S620, it is determined whether the CCM of the known remote MEP is received during the second time interval. If the CCM of the known remote MEP is not received during the second time interval, step S630 is executed. In step S630, an error notification is transmitted and the record of the known remote MEP in the storage unit is updated. If the CCM of the known remote MEP is received during the second time interval, step S640 is executed. In step S640, the record of the known remote MEP in the storage unit is updated. In the embodiment, the second time interval is set equal to the second multiple of the CCM interval by the local MEP.

Therefore, in the network device recognition method described in connection with the aspects disclosed herein, the local MEP can determine whether there is a need to update or delete the remote MEP automatically after the unknown remote MEP is registered in the storage unit. In the traditional method, the user needs to set the unknown remote MEP manually. Therefore, the network device recognition method can provide user with a convenient method to reduce the complexity of the process of maintaining and updating the database.

The above paragraphs describe many aspects. The teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A network device recognition method, comprising following steps:
    receiving a Continuity Check Message (CCM) by a local Maintenance Association End Point (MEP);
    determining whether the CCM is transmitted from an unknown remote MEP;
    setting the unknown remote MEP as a dynamic MEP if the CCM is transmitted from the unknown remote MEP;
    recording the dynamic MEP and a receiving count of the CCM corresponding to the dynamic MEP in a storage unit; and
    activating a first timing mechanism with a first time interval for determining whether the CCM transmitted by the dynamic MEP is received during the first time interval, wherein if the CCM of the dynamic MEP is not received during the first time interval, a record of the dynamic MEP and the receiving count of the CCM corresponding to the dynamic MEP is deleted; if the CCM of the dynamic MEP is received during the first time interval, the receiving count of the CCM is updated.

2. The network device recognition method of claim 1, further comprising following steps:
   determining whether a known remote MEP is the dynamic MEP if the CCM is transmitted from the known remote MEP; and
   determining whether the receiving count of the CCM is more than or equal to a default value if the known remote MEP is the dynamic MEP,
   wherein if the receiving count of the CCM is more than or equal to the default value, the dynamic MEP is set as a normal MEP allow for reading, and
   wherein if the receiving count of the CCM is less than the default value, continuing the first timing mechanism and the receiving count of the CCM is updated.

3. The network device recognition method of claim 2, further comprising following steps:
   activating a second timing mechanism with a second time interval for determining whether the CCM of the normal MEP is received during the second time interval,
   wherein if the CCM of the normal MEP is not received during the second time interval, an error notification is transmitted, and the normal MEP and the receiving count of the CCM corresponding to the normal MEP recorded in the storage unit are deleted;
   wherein if the CCM of the normal MEP is received during the second time interval, the receiving count of the CCM is updated.

4. The network device recognition method of claim 2, further comprising following steps:
   activating a second timing mechanism with a second time interval for determining whether the CCM of the known remote MEP is received during the second time interval, if the known remote MEP is not the dynamic MEP,
   wherein if the CCM of the known remote MEP is not received during the second time interval, an error notification is transmitted by the local MEP and a record of the known remote MEP in the storage unit is updated, and
   wherein if the CCM of the known remote MEP is received during the second time interval, the record of the known remote MEP in the storage unit is updated.

5. The network device recognition method of claim 3, wherein the first time interval is equal to a first multiple of the CCM interval and the second time interval is equal to a second multiple of the CCM interval.

6. The network device recognition method of claim 4, wherein the second time interval is equal to a second multiple of the CCM interval.

7. A network device, comprising:
   a local Maintenance Association End Point (MEP), receiving a Continuity Check Message (CCM) transmitted from a remote MEP, determining whether the remote MEP is an unknown remote MEP, setting the unknown remote MEP to a dynamic MEP if the remote MEP is the unknown remote MEP; and
   a storage unit, coupling with the local MEP and recording the dynamic MEP and a receiving count of the CCM corresponding to the dynamic MEP,
   wherein the local MEP activates a first timing mechanism with a first time interval for determining whether the CCM corresponding to the dynamic MEP is received during the first time interval, the local MEP updates the receiving count of the CCM when the CCM of the dynamic MEP is received during the first time interval, and local MEP deletes a record of the dynamic MEP and the receiving count of the CCM corresponding to the dynamic MEP from the storage unit when the CCM of the dynamic MEP is not received during the first time interval.

8. The network device of claim 7, wherein the local MEP determines whether a known remote MEP is the dynamic MEP as the CCM is transmitted from the known remote MEP, the local MEP further determines whether the receiving count of the CCM when the known remote MEP is determined as the dynamic MEP, wherein the local MEP determines the receiving count of the CCM is more than or equal to a default value, and sets the dynamic MEP as a normal MEP allow for reading, or the local MEP determines the receiving count of the CCM is less than a default value, and the local MEP continues the first timing mechanism and updates the receiving count of the CCM.

9. The network device of claim 8, wherein the local MEP further activates a second timing mechanism with a second time interval for determining whether the CCM of the normal MEP is received during the second time interval, the local MEP transmits an error notification and deletes the normal MEP and the receiving count of the CCM corresponding to the normal MEP recorded in the storage unit when the CCM of the normal MEP is not received in the second time interval.

10. The network device of claim 8, wherein the local MEP activates a second timing mechanism with a second time interval for determining whether the CCM of the known remote MEP is received during the second time interval as the known remote MEP is not the dynamic MEP, and the local MEP updates the record of the known remote MEP in the storage unit accordingly as the CCM of the known remote MEP is received during the second time interval, wherein the local MEP transmits an error notification and updates a record of the known remote MEP in the storage unit as the CCM of the known remote MEP is not received during the second time interval.

11. The network device of claim 9, wherein the first time interval is equal to a first multiple of the CCM interval and the second time interval is equal to a second multiple of the CCM interval.

12. The network device of claim 10, wherein the second time interval is equal to a second multiple of the CCM interval.

* * * * *